United States Patent [19]
Pankinaho

[11] Patent Number: 6,140,966
[45] Date of Patent: *Oct. 31, 2000

[54] DOUBLE RESONANCE ANTENNA STRUCTURE FOR SEVERAL FREQUENCY RANGES

[75] Inventor: Ilkka Pankinaho, Paimio, Finland

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 09/109,572

[22] Filed: Jul. 2, 1998

[30] Foreign Application Priority Data

Jul. 8, 1997 [FI] Finland ..................... 972897

[51] Int. Cl.$^7$ ..................................................... H01Q 1/38
[52] U.S. Cl. ................................. 343/700 MS; 343/702; 343/828; 343/876
[58] Field of Search ............................ 343/700 MS, 702, 343/846, 826, 828, 876; H01Q 1/38

[56] References Cited

U.S. PATENT DOCUMENTS

| | | | |
|---|---|---|---|
| 4,320,401 | 3/1982 | Schiavone | 343/700 |
| 4,783,661 | 11/1988 | Smith | 343/700 |
| 4,998,078 | 3/1991 | Hulkko | 333/109 |
| 5,068,669 | 11/1991 | Koert et al. | 343/700 MS |
| 5,075,820 | 12/1991 | Juskey et al. | 343/700 MS |
| 5,124,733 | 6/1992 | Haneishi | 343/700 MS |
| 5,173,711 | 12/1992 | Takeuchi et al. | 343/700 MS |
| 5,241,321 | 8/1993 | Tsao | 343/700 MS |
| 5,276,920 | 1/1994 | Kuisma | 455/101 |
| 5,341,149 | 8/1994 | Valimaa et al. | 343/895 |
| 5,406,615 | 4/1995 | Miller, II et al. | 379/59 |
| 5,550,554 | 8/1996 | Erkocevic | 343/828 |
| 5,561,435 | 10/1996 | Nalbandian et al. | 343/700 MS |
| 5,561,439 | 10/1996 | Moilanen | 343/846 |
| 5,568,155 | 10/1996 | Tsunekawa et al. | 343/700 MS |
| 5,625,365 | 4/1997 | Tom et al. | 343/700 MS |
| 5,627,550 | 5/1997 | Sanad | 343/700 MS |
| 5,644,319 | 7/1997 | Chen et al. | 343/702 |
| 5,657,028 | 8/1997 | Sanad | 343/700 MS |
| 5,680,144 | 10/1997 | Sanad | 343/700 MS |
| 5,969,681 | 10/1999 | O'Neill, Jr. | 343/700 MS |

FOREIGN PATENT DOCUMENTS

| | | |
|---|---|---|
| 0 630 069 A1 | 12/1994 | European Pat. Off. . |
| 0 687 030 A1 | 12/1995 | European Pat. Off. . |
| 0798880A2 | 10/1997 | European Pat. Off. . |
| 99219 | 7/1997 | Finland . |
| WO 90/13152 | 11/1990 | WIPO . |

OTHER PUBLICATIONS

Finnish Communication.
Electronics Letters 28$^{th}$ Mar. 1996 vol. 32 No. 7 pp. 609–610.

*Primary Examiner*—Don Wong
*Assistant Examiner*—Shih-Chao Chen
*Attorney, Agent, or Firm*—Perman & Green, LLP

[57] ABSTRACT

The invention relates to small-sized antenna systems, especially planar antenna structures operating on several frequency bands. The antenna structure of the invention comprises a radiating antenna element with at least two lips. Thus, the antenna structure has two basic resonance frequencies, which are defined by the dimensions of the lips of the antenna element, gaps between them, and the other dimensions of the antenna structure. The radiating antenna structure is connected to the ground plane at least at one place. The radiating antenna element comprises at least two connection points, which are used for connecting the feed lines of the transmitter and receiver, and for connecting special tuning elements. The resonance frequencies of the antenna structure may be adjusted by connecting the said tuning elements to the connection points and antenna feed lines so that the antenna structure is operable on more than two frequency bands. The switches may be conventional semiconductor switches, such as FET switches or PIN diodes. Various optionally connectable tuning element or antenna feed arrangements may be used for carrying out an antenna arrangement which may be tuned in on all reception and transmission bands of an arrangement with several frequency ranges and mobile phone systems.

15 Claims, 10 Drawing Sheets

DOUBLE RESONANCE ANTENNA STRUCTURE FOR SEVERAL FREQUENCY RANGES

The present invention relates to small-sized antenna systems, especially planar antenna structures operating on several frequency bands.

A conventional microstrip antenna comprises a ground plane and a radiating element isolated from it by a dielectric layer. The resonance frequency of the microstrip antenna is determined by the dimensions of the radiating element and by the distances between the radiating element and the ground plane. Microstrip antenna structures are generally described, for example, in the books "Handbook of Microstrip Antennas", J. R. James and P. S. Hall (Eds.), Vol 1, Peter Peregrinus Ltd, London 1989, and "Analysis, Design, and Measurement of Small and Low-Profile Antennas", K. Hirasawa and M. Haneishi, Artech House, Boston 1992.

Previously known are also microstrip antenna structures, in which one side of the radiating element is short-circuited to the ground plane. With such an arrangement, a certain resonance frequency may be reached by considerably smaller physical dimensions than those of the simplest microstrip antenna described above.

A problem with the planar-like antenna structures of the known tehnology is that they are thick and narrow-band. Antennas used in personal mobile stations have to be small. However, thinning of the microstrip antenna narrows the usable frequency band of the antenna. Many mobile communication systems require a relatively wide frequency band, e.g. the DCS-1800 system needs about 10% relative frequency band with respect to the medium frequency.

In a GSM system, for example, the distance between the transmission and reception bands is 45 MHz; the transmission band is 890 MHz–915 MHz, and the reception band 935 MHz–960 MHz. With single resonance antennas, the frequency band has to be considerably wide, i.e. in the case of GSM, at least 890 MHz–960 MHz. Due to manufacturing tolerances and objects near the antenna, e.g. user's hand, affecting the resonance frequency, the band width has to be even wider than the value in the mentioned ideal case.

Another approach is to use a double resonance antenna, the first frequency band of which corresponds to the transmission band, and the second frequency band corresponding to the reception band. In this case, the frequency bands of the antenna need not be as wide as those of an antenna having only one frequency band. Such antennas having two resonance bands may, for example, consist of two helix antennas tuned in to different frequencies, or of a combination of a rod antenna and a helix, in which the rod and the helix are tuned in different frequency ranges. Such structures are, for example, disclosed in the Finnish patent application 952780. However, these kinds of helix antenna structures are difficult to realize inside a case of a mobile station. Further, these solutions only operate on two frequency bands. Future versatile mobile stations operable in more than one mobile communication system, however, need antenna structures operation on more than two separate frequency bands.

Planar-like antenna structures of two frequency bands are disclosed, for example, in the patent application U.S. Pat. No. 5,124,733. The patent publication discloses a microstrip antenna structure, comprising a ground plane and, additionally, one active radiating element and one passive element. The elements are a quarter of a wave long and short circuited to the ground plane via one side. The resonance frequencies of the elements differ from each other, thus forming two separate operation frequency bands for the antenna structure. A drawback of this solution is the thickness caused by two superimposed antenna elements. Likewise, also this solution enables the operation of two frequency bands, only.

It is the object of the present invention to provide an antenna arrangement operating on several frequency bands. In addition, it is the invention's object to provide as small as possible an antenna arrangement integrated with a mobile station. Further, it is the object of the invention to provide an antenna arrangement for mobile stations using several frequency ranges and telecommunication systems.

The objects are realized by forming a planar antenna, the radiating antenna element of which includes at least two lips, thus providing the antenna structure with two separate resonance frequencies. The antenna element comprises at least two connection points, to which the feed line of the transmitter and the feed line of the receiver are connected. The resonance frequencies of the antenna structure may be adjusted by separate tuning elements which may optionally be connected to the connection points or feed lines.

It is characteristic of the antenna structure of the invention, that said antenna element has at least two separate resonance frequencies, and that the said antenna element has at least two connection points for connecting the feed lines of the antenna structure.

The present invention also concerns a mobile station, which is characterized in that said antenna element has at least two connection points for connecting the feed lines, and that the said antenna arrangement further comprises at least one switch and at least one tuning element so that said at least one tuning element can be connected to the connection point of the antenna element with said at least one switch for changing at least one resonance frequency of the antenna arrangement.

The antenna structure of the invention contains at least two lips in the radiating antenna element. Thus, the antenna structure has two basic resonance frequencies which are defined by the dimensions of the lips of the antenna element, and by the gaps between them, and by other dimensions of the antenna structure. The radiating antenna element is connected to the ground plane at least at one point. The radiating antenna element contains at least two connection points which are used for connecting the feed lines of the transmitter and receiver, and for connecting special tuning elements. Resonance frequencies of the antenna structure may be adjusted by connecting said tuning elements to the connection points and the antenna feed lines, thus making the antenna structure operable on more than two frequency bands. The switches may be conventional semiconductor switches, such as FET switches or PIN diodes. Various optionally connectable tuning element or antenna feed arrangements may be used for providing an antenna arrangement which can be tuned in on all reception and transmission bands of several frequency ranges and telecommunication systems.

The present invention is next described in more detail referring to the advantageous embodiments shown and to the enclosed drawings, in which FIG. 1 shows an antenna element of an antenna structure according to an advantageous embodiment of the invention;

FIG. 2 describes an antenna structure of an advantageous embodiment;

The same reference numbers and indications are used for corresponding parts in the figures.

Figure 1:
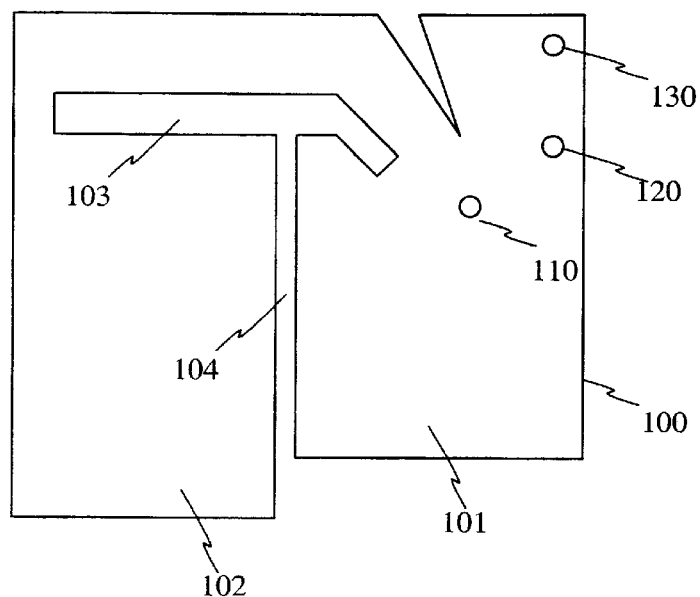

In FIG. 1, there is shown the shape of an radiating element 100 of an antenna in accordance with an advantageous embodiment of the invention. The element 100 comprises a shorter side 101 and a longer side 102 with gaps 103, 104 inbetween. The element is short-circuited to ground plane at the short circuit point 130. The element includes two connection points 110, 120 for the antenna feed and tuning elements.

The resonance frequencies of the element are dependent on the interrelation of the dimensions of the antenna element halves 101, 102. The dimensions of the halves of the longer antenna define the lower resonance frequency, the dimensions of the halves of the shorter antenna defining the higher resonance frequency. In addition, also the relations between the widths and lengths of the gaps 103, 104 affect the resonance frequencies.

The placing of the feed point makes it possible to choose which of the element halves has a stronger effect. By forming two different feed points for the antenna element, it is possible to form two different operation bands for one antenna element. The choice of the frequency band to be used enables the use of a narrow frequency band, either one of a reception or a transmission frequency band, thus making the antenna easier to manufacture.

The feed point to be used may be chosen, for example, by a switch on the feed line of the receiver. When the transmitter is connected to the antenna, the receiver is separated from the antenna by the switch, and during reception, the receiver is connected to the antenna. The switch may also be a change-over switch, which is used for connecting either the transmitter or the receiver to the antenna.

The switches may, for example, be PIN diodes. Also other semiconductor switches, such as FET switches, according to the conventional technology, may be used as switches. In some applications, also conventional mechanical switches may be used.

The dimensions of the antenna element in FIG. 1 may advantageously be, for example, about 28×25 mm, whereby the basic resonance frequencies coincide approximately with the frequency bands of the GSM system.

Figure 2:
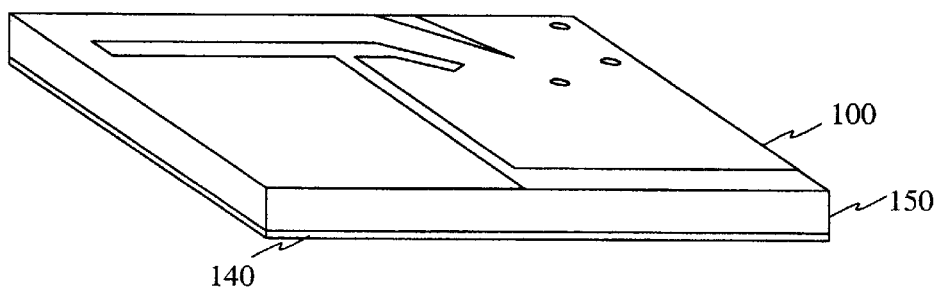

FIG. 2 shows an antenna structure formed by the antenna element 100 of FIG. 1. The antenna structure includes an antenna element 100, a ground plane 140, and an intermediate insulating layer or gap 150. It is possible to affect the band width of the antenna structure, its performance and the minimum size to be reached by the choice of distance between the antenna element 100 and the ground plane 140, and by the choice of a suitable insulating material. The insulating material may be air, if the antenna element is realized as a self-supporting structure. Other possible materials are, for example, various plastics and ceramic materials, depending on the desired manufacturing method and the dielectric constant. The insulating layer 150 may also consist of a combination of the above-mentioned materials, such as various hollow plastic structures for the reduction of weight and losses.

Resonance frequencies of the antenna element in FIG. 1 may further be adjusted by separate tuning elements. The tuning element may be a capacitive element or an inductive element or a combination of these. The tuning element may be connected to the ground potential, for example, from the connection point 110, 120 of the antenna element 100, or the tuning element may form a part of the feed line extending from the transmitter or receiver. There may also be more than one tuning element, thus making it possible to switch on the desired tuning element or a combination of tuning elements by special switches. These switches may advantageously be conventional semiconductor switches. By using different kinds of tuning elements, the antenna structure is made to tune in to several different frequency bands.

Figure 3:
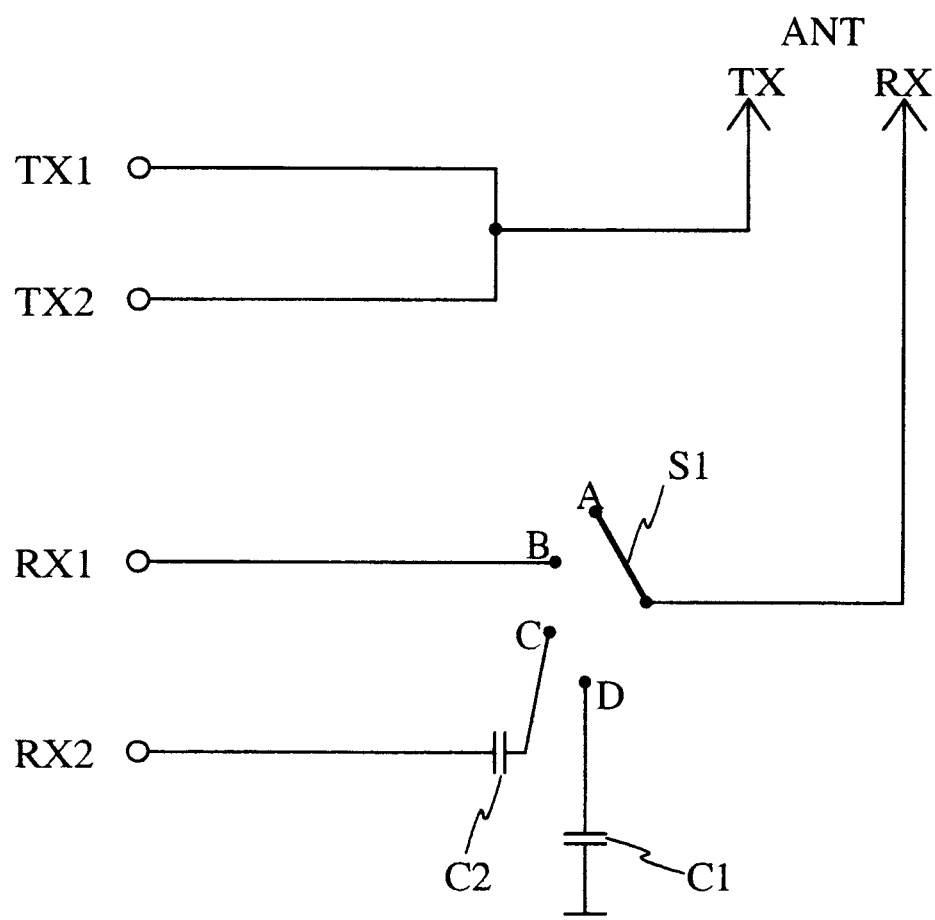
FIG. 3 shows a feed arrangement in accordance with an advantageous embodiment of the invention.

The use of tuning elements is illustrated in FIG. 3. The example in FIG. 3 describes a mobile station operating in two frequency ranges so that the frequency ranges each have separate transmission and reception frequency bands. In this kind of application, the antenna has to resonate on four separate resonance bands. In the embodiment of FIG. 3, the basic resonance frequencies of a two-part antenna element correspond to the first transmission band, the change-over switch is in position A, and the receiver part RX1 of the first frequency band is not connected to the antenna. During reception on the first reception band, the change-over switch S1 is in position B, and the receiver part RX1 of the first frequency band is connected to the receiver feed point of the antenna. When transmitting on the second transmission band, the change-over switch S1 is in position D, and the receiver feed point of the antenna is connected to the ground potential via capacitor C1. Thus, the capacitor C1 forms a tuning element of the kind described above, tuning a resonance frequency of the antenna to the said second transmission band. During reception on the second frequency band, the change-over switch S1 is in position C, and the receiver part RX2 of the second reception band is connected to the reception feed point via capacitor C2. Thus, the capacitor C2 forms a second tuning element of the kind described above, tuning a second resonance frequency of the antenna to the said second reception band. In this embodiment, the transmitter part TX1 of the first frequency range and the transmitter part TX2 of the second frequency range are integrally connected to the transmitter feed point of the antenna element.

By adding various matching elements and connection alternatives, it is possible in a way illustrated in FIG. 3 to realize antenna systems which can be made to resonate on more than four frequency bands.

In telecommunication systems, in which the receiver and transmitter do not operate simultaneously, advantageously only either the feed line of the transmitter or that of the receiver is connected. Such systems are, for example, GSM, DCS and PCN. In such telecommunication systems, in which the receiver and transmitter are simultaneously in operation, also the receiver antenna and the transmitter antenna have to be connected simultaneously. Such systems include i.a. CDMA system and analog systems, e.g. AMPS, TACS and NMT.

Figure 4:
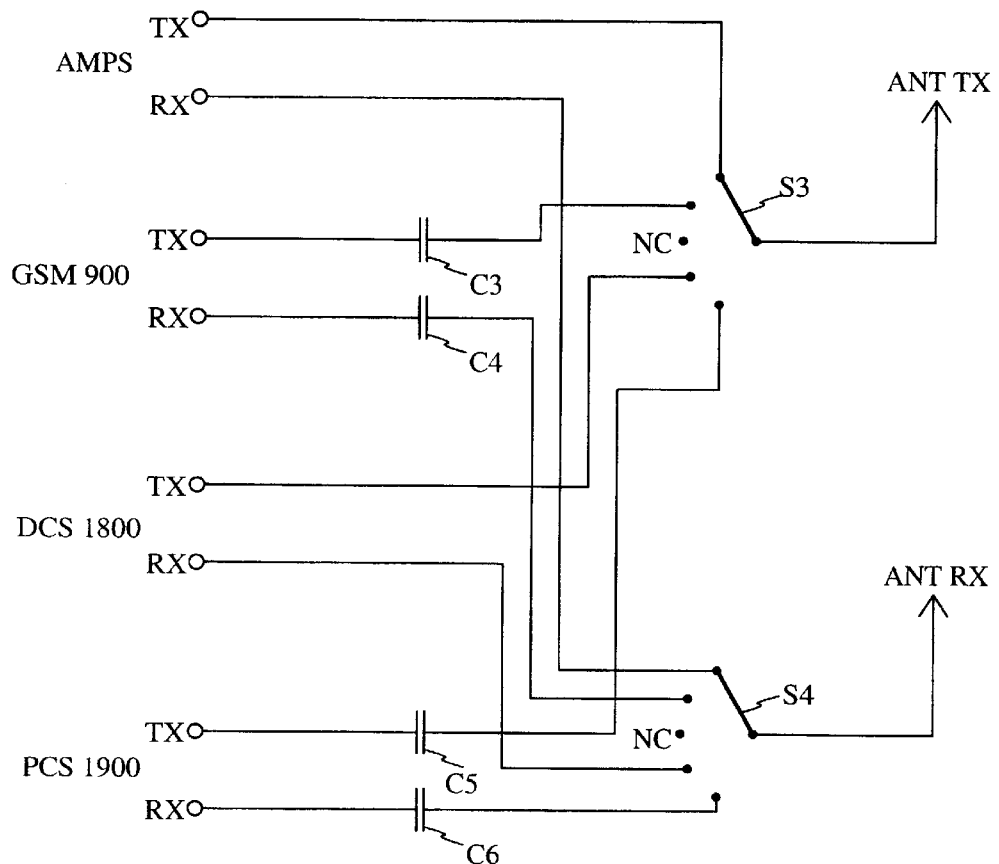
FIG. 4 shows an advantageous embodiment which makes it possible to make the same device operable in four different frequency ranges.

The antenna system of the present invention may be used in all these telecommunication systems. In FIG. 4, there is shown an example of a possible antenna arrangement in a mobile station, which is fitted to operate both in AMPS, GSM 900, DCS 1800, and PCS 1900 systems. In this embodiment, the resonance frequencies of the antenna element 100 (not shown in FIG. 4) cover the transmission and reception frequencies of both the AMPS and DCS 1800 systems. The antenna can also be tuned in on the frequency bands of the GSM 900 system and the PCS 1900 system by tuning elements C3, C4, C4 and C6. The dimensioning of the tuning elements C3, C4, C5 and C6 depends i.a. on the length of the transmission lines supplying the antenna, the impedances of the switches and the transmitter and reception filters, and on the tuning of the antenna element.

In time-division telecommunication systems, the switch S4 may most advantageously be placed in an unconnected position NC for the transmission period, and the transmitter may be connected to the antenna by the switch S3; and, on the other hand, for the reception period, the switch S3 may be placed in an unconnected position NC, and the receiver may be connected to the antenna by the switch S4. In this embodiment, the switches S3 and S4 may thus be controlled regardless of each other.

The embodiment in FIG. 4 is only one example of a possible embodiment of the present invention. In the antenna system of the invention, more or fewer frequency bands may be used.

The embodiment in FIG. 4 illustrates especially that switches and tuning elements may be used in all circuits connected to the various connection points of the antenna. In this embodiment, there are two connection points, of which the one is used to feed the output signal of the transmitter to the antenna element, and the other to connect the feed signal of the receiver to the receiver. The number of connection points may in various embodiments be different from two, and they can be connected also in some other way than the one shown in FIG. 4. For example, more than one connection point may be used for feeding the transmission signals of various frequency ranges.

In the antenna arrangement of the invention, the transmitter and receiver may be connected to the same connection point. Such an embodiment is presented in FIG. 5, which presents an exemplary switch arrangement of an advantageous embodiment for an antenna system of two frequency ranges. In this embodiment, the transmitter and receiver circuits are connected directly to the connection point of the antenna element, tuning elements and control switches being connected to the other connection point of the antenna element. In this embodiment, the basic resonance frequencies of the antenna element correspond to transmission frequency bands of two frequency ranges so that, during transmission, both switches of the tuning elements are in the unconnected position NC. Upon receiving the first reception frequency band, the switch S6 connects the tuning element C7 to the second connection point of the antenna so that a resonance frequency of the antenna shifts to the place of the first reception frequency band. Upon reception on the second reception frequency band, the tuning element C7 is connected to the second connection point by switch S5 so that a resonance frequency of the antenna switches over to the place of the second frequency reception band.

Figure 5:
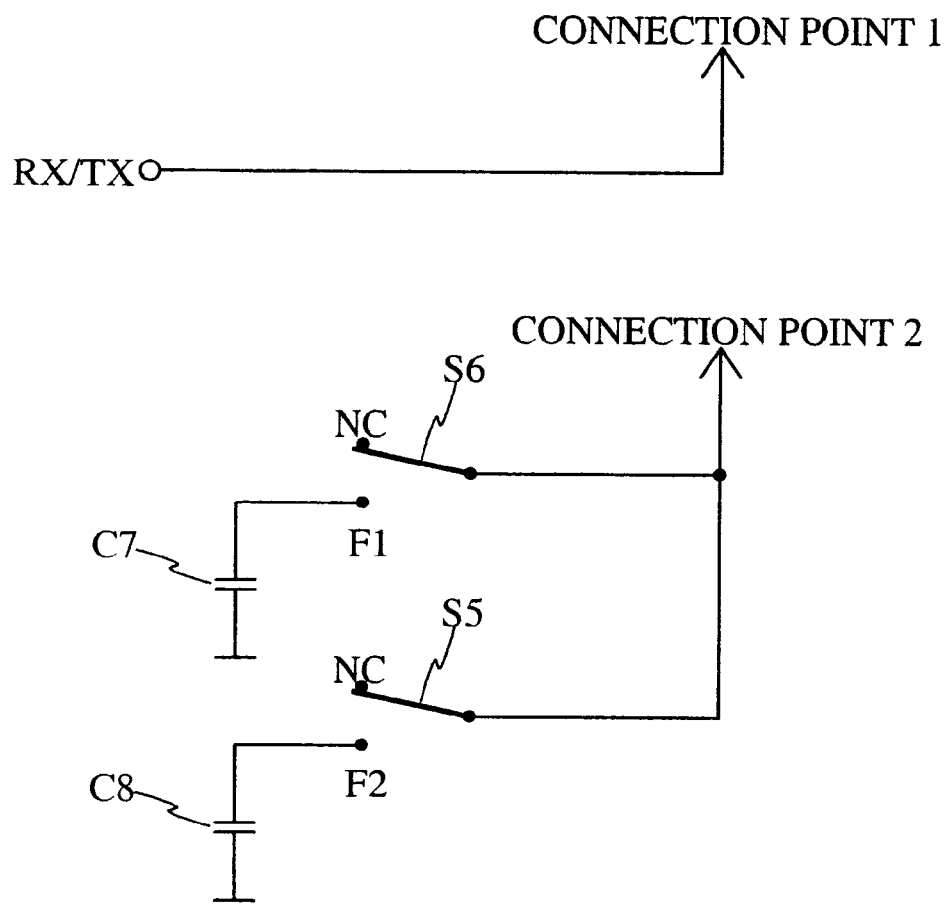
FIG. 5 shows an advantageous embodiment of the invention in which the transmitter and receiver of the apparatus are connected to the same connection point of the antenna.

In the embodiment of FIG. 5, both the connection points of the antenna are used for controlling the antenna, but yet in different ways: the first connection point is used for feeding the antenna and the second for adjusting the resonance frequencies of the antenna.

The antenna system of the present invention applied to a portable mobile station makes it possible also to use an external antenna. Most advantageously, this is achieved by adding switches to the feed line of the transmitter and the feed line of the receiver for connecting an external antenna to the transmitter and receiver. Most advantageously, the switches may be positioned so that the tuning elements of the antenna structure of the invention inside the mobile station do not affect the tuning of the external antenna. The external antenna may also be connected so that it is only used during the transmission period; in this case the transmitter part of the mobile station is connected to the external antenna and the receiver part of the mobile station is connected to the internal antenna structure of the mobile station. This solution makes it possible to use an external, efficient antenna in the transmission, which reduces the power consumption of the mobile station and allows longer charging intervals of the batteries of the mobile station.

The antenna system of the present invention is adapted for use especially in mobile stations of several frequency ranges, an advantageous example of which is a combined dual mode phone operable in the 900 MHz GSM and 1800 MHz DCS systems. The antenna system of the invention is suitable for use also in other kinds of combinations, for example, in the combined cellular network and satellite phone, which is being planned.

Figure 6:
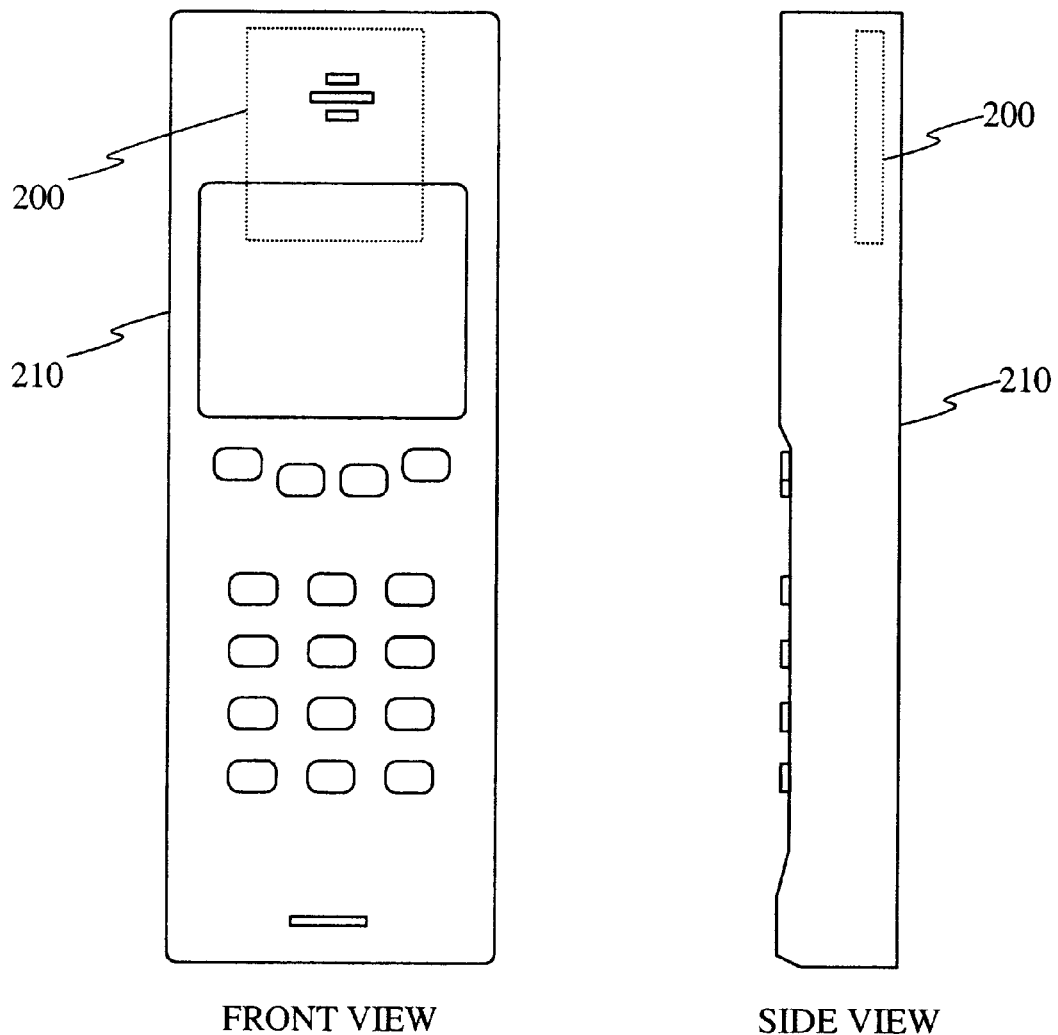
FIG. 6 illustrates the position of an antenna structure of the inention within a mobile station 210.

The antenna system of the invention is especially adapted for carrying out of internal multifrequency antenna systems for small mobile stations and other small-sized devices. This is illustrated in FIG. 6, which presents the placing of the antenna structure 200 of the present invention inside the mobile station 210.

The antenna structure of the invention may also be used for utilizing a frequency band which is wider than the band width of a certain resonance band of a single integrated antenna element. The resonance frequency of the antenna structure of the invention may be formed so that it can be shifted with small steps by tuning elements or suitably selected connection points, so that by shifting a narrow frequency band as needed, an advantageous operation is achieved in the whole of the wider frequency band. This kind of embodiment enables the reduction of the dimensions of the antenna structure at the expense of the band width so that the narrowing of the band width may be compensated by shifting the operation band as required. Such an embodiment also allows the optimization of the standing wave ratio, which may also be used in such cases where the operation band of the antenna is sufficient to cover the necessary frequency range. The standing wave ratio is typically at an optimum in the middle of the operational band of the antenna, whereby the antenna structure of the invention may be used to shift the optimum of the standing wave ratio to or near the frequency used at the time. Such a procedure is possible on both the transmission and reception bands. Shifting the operation band may in this and in other embodiments presented in this application be carried out continuously by adjustable tuning elements, e.g. capacitance diodes.

Figure 7:
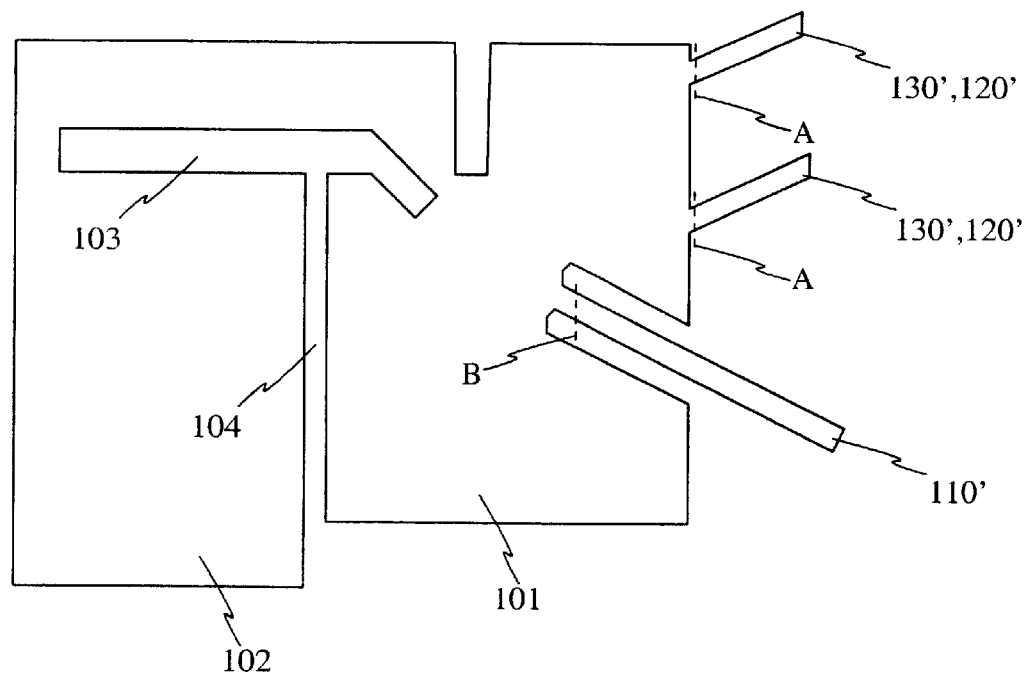
FIG. 7 illustrates an antenna element of an antenna structure in accordance with an advantageous embodiment of the invention.

In FIG. 7, there is shown another advantageous structure for the antenna element 100. This structure includes two lips 101, 102, as in the example of FIG. 1, separated by two slots 103, 104. In this embodiment, the earth connection and connection points are realized as strips 110', 120', 130'. Such a structure enables the simple fastening of the antenna element to the equipment. Spring contacts may advantageously be formed from the strips 110', 120', 130', for example, by bending them at the bending lines A, B so that it is possible to connect the antenna to the equipment by pressing the spring contacts formed by the strips, for example, against contact areas on the circuit board of the equipment. In the antenna element of FIG. 7, the strip 110' acts as a feed strip, and of the other two strips 120', 130', the one may be used as a grounding strip and the other for connecting the matching elements.

Figure 8:
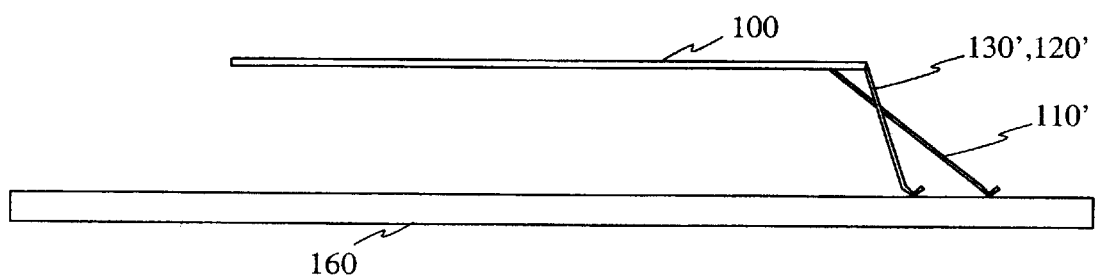
FIG. 8 illustrates the arrangement of the antenna element of FIG. 7 on a circuit board.

FIG. 8 illustrates the connection of the antenna element of FIG. 7 to the cirucit board 160 of a mobile station. The strips 110', 120', 130' of the antenna element 100 are bent to the contact areas on the circuit board. In this embodiment, the feed strip 110' may most advantageously be pressed against the contact area of an antenna filter component so that the most direct possible connection is achieved between the antenna and the filter component. Thus, it is possible to avoid the formation of excess losses due to the stray capacitance of the circuit board conductor between the filter component and the contact area meant for the feed line of the antenna on the circuit board. In the embodiment of FIG. 8, the ground plane of the antenna structure is formed on the surface of the circuit board 160 (not shown in the figure).

Figure 9:
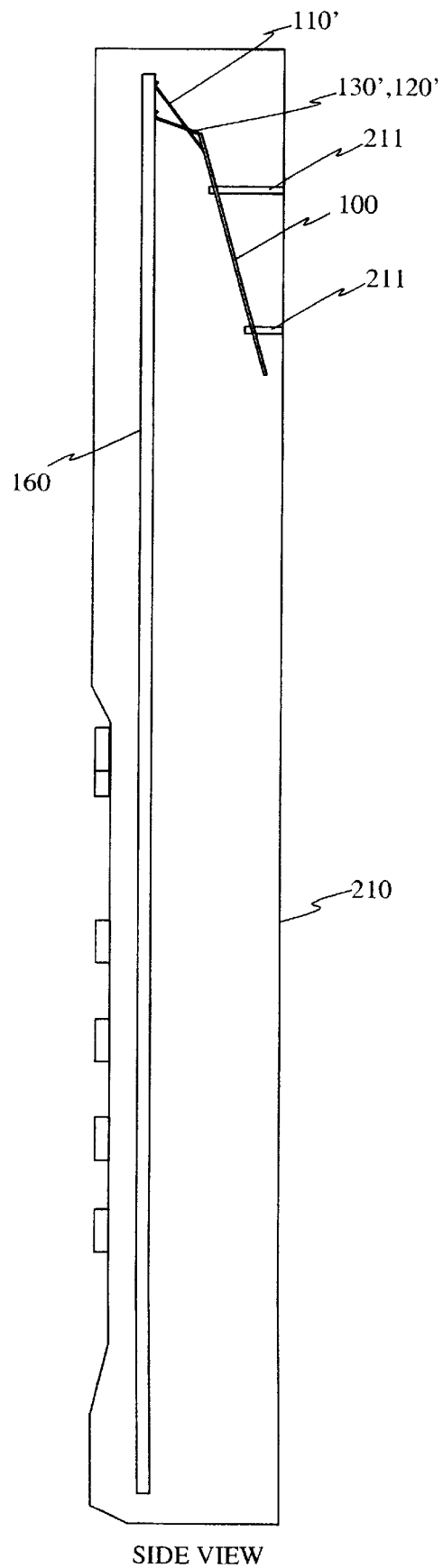
FIG. 9 illustrates an advantageous arrangement of the antenna element of FIG. 7 in a mobile station.

FIG. 9 illustrates the fastening of the antenna element of FIGS. 7 and 8 to the frame of the mobile station. The antenna may advantageously be attached to the back part of a two-piece case of a mobile station, for example, by pins 211 formed on the case of the case material. Fastening gaps (not shown in FIG. 7) may be provided in corresponding places of the antenna element 100; the antenna element is attached to the case so that the pins 211 coincide with the fastening gaps. The attachment may further be ensured, for example, by melting the pin heads a little so that the pins 211 conform exactly to the shape of the antenna element gaps. Such an antenna structure is very simple and economic to manufacture. FIG. 9 also illustrates the advantageous fastening position of the antenna element 100, with which it is possible to affect the directivity of the antenna structure. In the position shown in FIG. 9, the antenna lies closer to the ground plane in the direction of the upper part of the mobile station and farther away from the ground plane in the direction of the lower part of the mobile station. This directs the maximum of the antenna radiation pattern towards the horizontal plane in the typical usage position of the mobile station, or a little upwards, and not inadvantageously towards the ground.

The width of the resonance bands can further be widened by constructing the antenna in such a way that parts of the radiating element lying farthest from the antenna feed location are radiating in effectively free space, or at least in a surrounding which is closer in resemblance to free space than the surrounding around those parts of the radiating element lying near the antenna feed location.

Figure 10A:
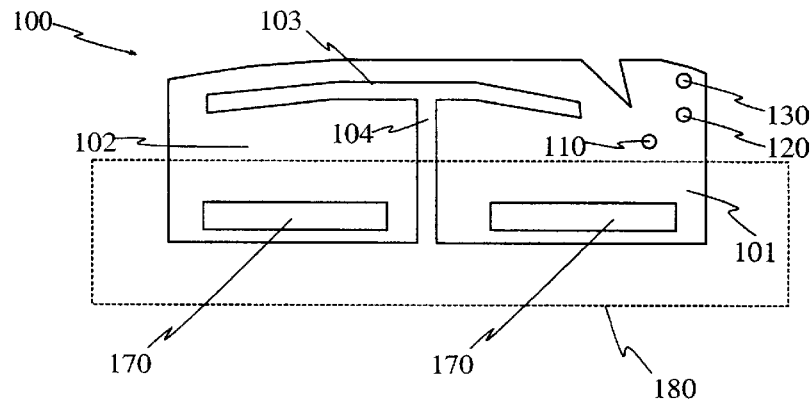
FIGS. 10a and 10b illustrate a further advantageous embodiment of the invention having a hole in the radiating element.
Figure 10B:
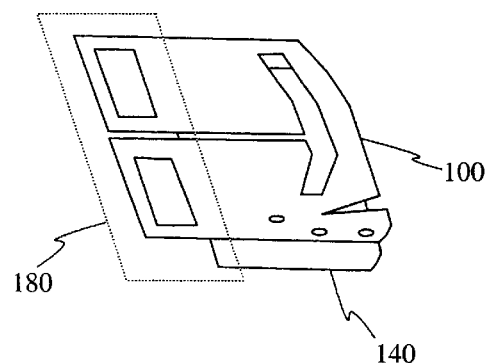

An antenna structure according to the invention may also have one or more holes in the sections 101, 102 of the radiating element. The effect of such holes is to widen the width of the resonance bands of the sections. The matching of the radiating element to the feed lines can also be adjusted with such holes. FIGS. 10a and 10b illustrate one example of such an embodiment of the invention. FIG. 10a shows a radiating element 100 having two holes 170, one in each section 101, 102 of the radiating element. The part of the radiating element 100 marked by dashed line 180 extends laterally outside the ground plane 140, as shown in FIG. 10b, which shows in perspective how the radiating element and ground plane may in this particular embodiment be placed relative to each other. The radiating element is advantageously connected to the ground plane via connection point 130, to the transmitter via connection point 120 and to the receiver via connection point 110.

Figure 11:
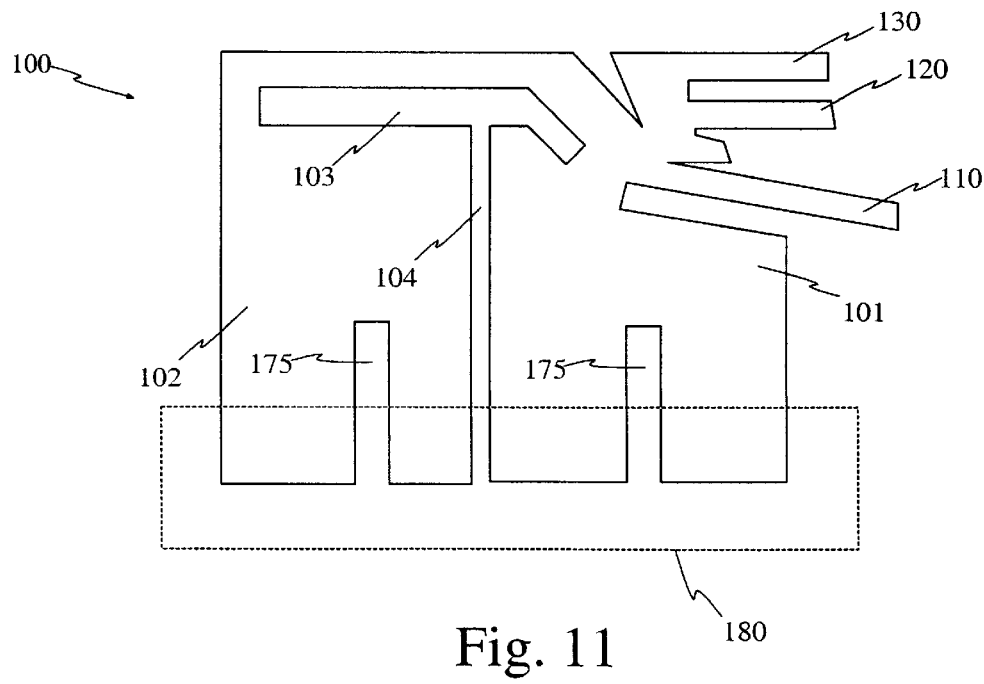
FIG. 11 illustrates a further advantageous embodiment of the invention having a notch in the radiating element.

FIG. 11 shows a further advantageous embodiment of the invention having a notch 175 in each of the sections 101, 102 of the radiating element 100. This configuration has a similar effect as the use of one or more holes 170, namely widening of the resonance bands of the radiating element. Notches can as well be used for adjustment of matching of the radiating element to the feed lines. Dashed line 180 shows the area of the radiating element lying outside the ground plane (not drawn). The radiating element is advantageously connected to the ground plane via grounding strip 130, to the transmitter via strip 120 and to the receiver via strip 110.

Figure 12A:
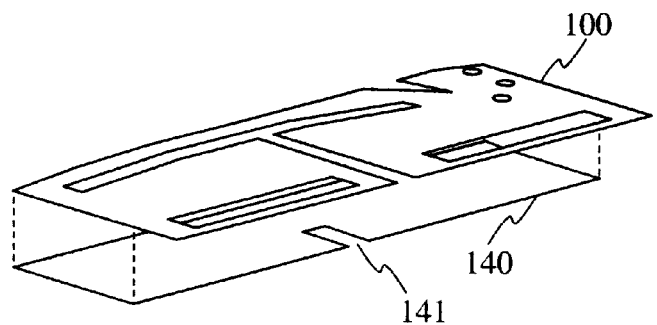
FIGS. 12a, 12b, and 12c illustrate a further advantageous embodiment of the invention, in which the resonance frequencies of the antenna structure are further adjusted by shaping of the ground plane of the antenna structure.
Figure 12B:
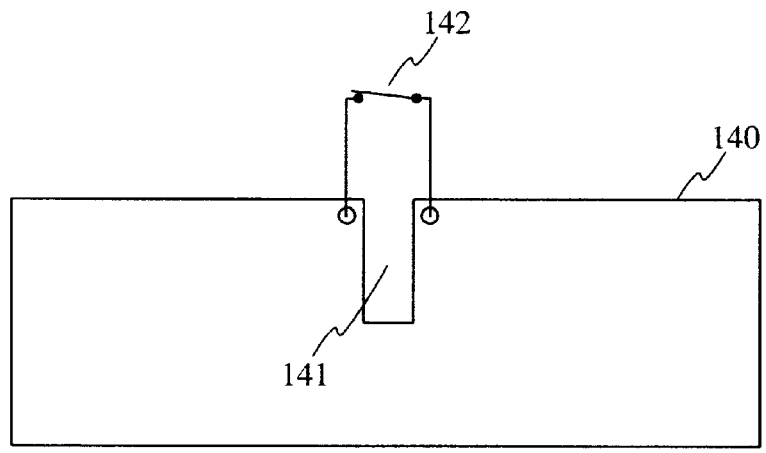
Figure 12C:
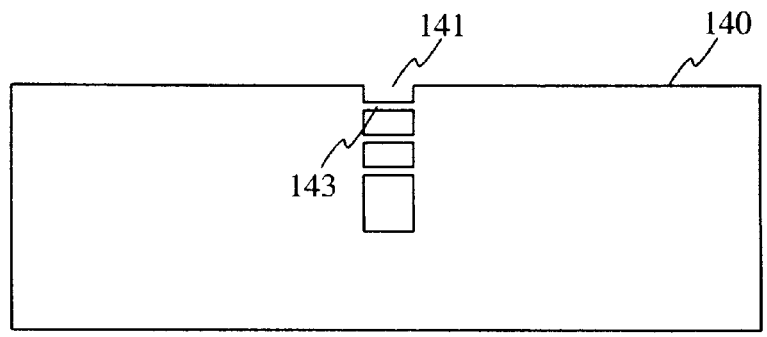

FIG. 12a illustrates such an advantageous embodiment, in which the resonance frequencies of the antenna are adjusted with both the shape of the radiating element 100 as well the shape of the ground plane 140. FIG. 12a shows a notch 141 formed in the ground plane 140. The notch has the effect of lowering the resonance frequencies of the antenna structure. The shape of the notch affects other electrical properties of the antenna structure, whereby the shaping of the notch can be used for matching the antenna structure to the feed lines. A suitable shape of the notch can be found out, for example, by experimenting. The resonance frequencies of the antenna structure can be lowered by changing the size of the notch 141. The effective size of the notch 141 can be changed even after the manufacture of the antenna structure for example in the way shown in FIG. 12b, by short circuiting certain locations on the sides of the notch with a switch element 142. More than one switch element 142 may be used, whereby the short circuit location can be changed by closing the desired switch element. This allows the control of resonance frequencies of the antenna structure by the control unit of a mobile communication means. The size of the notch 141 can also be adjusted using short circuiting strips 143 as shown in FIG. 12c. FIG. 12c illustrates one example of shaping and positioning of short circuiting strips, and in various embodiments of the invention, the strips may be shaped and positioned also in other ways. For example, the strips can cross the notch 141 in an oblique angle, or form a zigzag- or a network-like shape. According to the embodiment of FIG. 12c, the resonance frequency of the antenna structure can be adjusted by cutting one or more of the short circuiting strips 143. If the short circuiting strips 143 form a network-like configuration, also the shape of the notch 141 can be changed by cutting one or more of the short circuiting strips. An embodiment according to FIG. 12c allows the use of a single series produced ground plane component in different mobile communication systems having different operating frequency bands, whereby the antenna structure can be tuned to the particular operating frequency band by cutting a desired number of the short circuiting strips 143. The invention is not limited to the location of the notch 141 shown in FIGS. 12a, 12b, and 12c. In various embodiments of the invention, the notch 141 can be located in other locations in the ground plane.

The basic resonance frequency bands of the antenna structure according to the invention can advantageously be optimized such that they correspond to the receiving and transmitting frequencies of a desired telecommunications network, for example, to the receiving and transmitting frequency bands of the GSM900 system, and matching elements described previously be used to transfer these two resonance bands to corresponding bands of another telecommunications network. With such a structure, there is no need to connect or disconnect various matching elements for reception or transmission during communication to one network. Such a structure can advantageously be applied, for example, to the antenna system of FIG. 5 having a single feed point. Such a system has a further advantage, namely such a system allows simple attachment of a connector for an external antenna structure, since transmitter and receiver feeds form a single feed line, to which such a connector may directly be fixed.

The part of the radiating element extending past the ground plane can advantageously be positioned in such a way, that the average distance to surrounding components within the mobile unit is maximized or optimized. This can be effected for example by bending the radiating element so as to bring said part as far as possible away from near-lying components.

The antenna structures discussed in relation to FIGS. 10a, 10b, and 11 have as a further advantage a highly cross polarized radiation field, which is nearly omnidirectional. High degree of cross polarization improves the connection between the mobile unit and the base station antenna by reducing the effect of attitude of the mobile unit.

Above there have been described antenna structures which, besides the ground plane, include one advantageously two-part radiating element. In the antenna structure of the invention, it is possible to use passive elements of the known technology in addition to the radiating element.

The antenna structure of the invention also has low manufacturing and material costs. There is no need to provide the antenna element with a protective layer, as the antenna may most advantageously be positioned inside the mobile station case. The material of the antenna element may be conventional sheet metal or other similar metal plate, which is easy to press, and process in other ways. The support material of the antenna may consist of plastic material typically used in the mobile station case.

The ground plane 140 of the antenna structure may be formed in many different ways. One advantageous way is to use the electrically conductive area formed on the circuit plate 160 of the mobile station as ground plane. For example, also RF-protection of a component of the mobile station may be used as ground plane. The RF protection of the antenna filter may be given as an example. In case the mobile station includes some other metal component, e.g. a metal part in the mobile station frame, this may also be used as ground plane.

The shape of the element in FIG. 1 does not limit the various embodiments of the invention, but it is also possible to provide the antenna structure of the invention with antenna elements of different shapes with two resonance frequencies, the elements including at least two connection points placed unsymmetrically to the antenna element. In addition, various embodiments may include elements divided into more than two parts for providing more than two basic resonance frequencies.

The antenna structure of the invention may also be utilized in several other state-of-the-art radio applications of the known technology requiring a small-sized antenna, for example, in a base station for a wireless office system. A thin planar antenna may be installed, for example, in the same case with other components of the base station so that such a small base station may simple be installed to the place of use, e.g. a wall of the office corridor, without having to separately install the antenna.

The antenna structure of the invention is smaller than a conventional, state-of-the-art strip antenna of the same frequency range. The structure of the invention may easily be used for producing an antenna of two or more frequency ranges.

The antenna arrangement of several frequency ranges of the invention is smaller than the conventional solutions, as the structure of the invention does not require any duplexers which are larger than conventional semiconductor switches, e.g. FET switches. In addition, operation on several frequency ranges considerably complicates the conventional duplex structure, thus making the damping of the duplexer relatively large. When using a conventional FET switch, the damping is only about 0.3 dB.

The antenna structure of the invention is small and simple to manufacture. Because of the tuning elements, the standing-wave ratio is very good on all operation frequency bands.

It is obvious for those skilled in the art that the above embodiments may be combined in many different ways within the various applications of the invention. Above, the invention has been illustrated with reference to some of its advantageous embodiments, but it is obvious that the invention may be modified in many different ways in accordance with the basic inventive idea defined in the enclosed claims.

What is claimed is:

1. An antenna structure for use in a multiband device, comprising a planar antenna element and a ground plane so that the said antenna element is short-circuited to the ground plane at least at one place, characterized in that said antenna element has at least two separate resonance frequencies, and that said antenna element has at least two connection points for connecting feed lines of the antenna, so that the antenna structure works in at least two TX-frequency bands and two RX-frequency bands of at least two wireless systems.

2. The antenna structure of claim 1, characterized in that it additionally comprises at least two lips forming different resonance frequencies.

3. The antenna structure of claim 1, characterized in that it additionally comprises at least one tuning element for changing the resonance frequency of the antenna structure.

4. The antenna structure of claim 3, characterized in that at least one of said at least one tuning element is connected between one of said two connection points of the antenna element and the ground plane.

5. The antenna structure of claim 4, characterized in that at least one of the at least one tuning element forms part of the feed line of the antenna.

6. The antenna structure of claim 3, characterizeed in that it additionally comprises at least one switch for selectively connecting at least one of said at least one tuning element to the antenna structure.

7. The antenna structure of claim 3, characterized in that it additionally comprises at least one switch for selectively connecting more than one transmitter feed line to a connection point of said antenna element.

8. The antenna structure of claim 3, characterized in that it additionally comprises at least one switch for selectively connecting more than one receiver feed line to a connection point of the antenna element.

9. A mobile station, the antenna arrangement of which comprises a radiating antenna element and a ground plane, characterized in that said antenna element has at least two connection points for connecting the feed lines, and that the said antenna element further comprises at least one switch and at least one tuning element, said at least one tuning element being connectable to the connection point of the antenna element with said at least one switch for changing at least one resonance frequency of the antenna arrangement.

10. An antenna structure for use in a multiband device having a planar antenna element and a ground plane, the antenna element being short-circuited to the ground plane at least at one place, wherein the antenna element has

- at least two connection points in the antenna element for connection of the feed lines of the antenna structure,
- at least two lips in the antenna element for forming at least two separate resonance frequency bands of the antenna structure, and the antenna structure further has at least one tuning element for changing a resonance frequency of the antenna structure, so that the antenna structure works in at least two TX-frequency bands and two RX-frequency bands of at least two wireless systems.

11. The antenna structure of claim 10 wherein at least one slot is formed between the lips.

12. The antenna structure of claim 11 wherein a second slot separates the lips.

13. The antenna structure of claim 12 wherein the second slot is arranged in a "T" shaped formation with respect to the at least one slot.

14. The antenna structure of claim 13 further including a hole in each of the lips for the purpose of widening the width of the resonant frequency bands formed by the lips.

15. The antenna structure of claim 13 further including a notch in each of the lips for the purpose of widening the width of the resonant frequency bands formed by the lips.

* * * * *